United States Patent Office 3,825,651
Patented July 23, 1974

3,825,651
RECOVERY OF GOLD FROM ORES
Harold J. Heinen, Reno, and Judith A. Eisele, Verdi, Nev., and Dennis D. Fischer, Mitchell, S. Dak., assignors to the United States of America as represented by the Secretary of the Interior
No Drawing. Filed Oct. 14, 1971, Ser. No. 189,198
Int. Cl. C01g 7/00; C22b 11/06
U.S. Cl. 423—44
9 Claims

ABSTRACT OF THE DISCLOSURE

Gold is recovered from its ores by treating the ores at elevated temperature with gaseous chlorine in the presence of metallic iron, a sulfide of iron, aluminum sulfide or gallium sulfide to form a volatile complex of the formula $AuMeCl_6$, where Me is iron, aluminum or gallium.

---

Chloride volatilization of gold has long been employed for recovery of gold from its ores. Such processes are disclosed, e.g., in Bureau of Mines Bulletin No. 211 and Reports of Investigations 4612 and 5409. In these prior art processes the ore is roasted with a salt such as sodium chloride or calcium chloride, usually at high temperature such as about 1000° C., to form the volatile gold chloride $Au_2Cl_6$. Such processes, however, are generally inefficient, i.e., they give a relatively low yield of gold, and they require a high operating temperature.

It has now been found, in accordance with the process of the invention, that a much more efficient recovery of gold, at a lower temperature, may be accomplished by treatment of the ore with a stream of gaseous chlorine, at a temperature of about 200–500° C., in the presence of a promoter comprising a compound of iron, aluminum or gallium, as more fully defined below. This results in formation of the highly volatile complex $AuMeCl_6$, where Me is iron, aluminum or gallium, which is then swept out of the reaction zone by the gaseous chlorine.

The process of the invention may be carried out in any apparatus capable of providing the required stream of gaseous chlorine, intimate contact between the ore and the gaseous chlorine, suitable operating temperature and means for condensing the volatile $AuMeCl_6$ complex. Suitable types of apparatus include rotary kilns, as described in above-mentioned Bureau of Mines Bulletin, electric tube furnaces, fluid bed reactors, etc., provided with inlet and outlet means for the chlorine reactant and the gaseous products of the reaction, largely the $AuMeCl_6$ complex and unreacted chlorine. Means should also be provided for agitating the ore in order to provide efficient contact with the gaseous chlorine.

The ore may be any conventional gold ore, including low-grade ores from which the gold cannot be economically recovered by means of prior art processes. The ores usually consist of gold associated with quartz, other metals, sulfides or tellurides. The ore is initially ground to a particle size of about one inch to 200 mesh to enable efficient contact with the gaseous chlorine.

Suitable temperatures will range from about 200 to 500° C. Higher temperatures, e.g., up to about 1000° C., may be used; however, this usually results in little, if any, increase in recovery of gold. In fact, as discussed above, one of the chief advantages of the invention is the efficiency of recovery of gold at lower temperatures than those employed in the prior art.

The chlorine reactant may consist of essentially pure gaseous chlorine, or it may be diluted with air or an inert gas such as nitrogen, argon or helium in an amount of about 10 to 50 volume percent of the gas. Optimum amount and flow rate of the gaseous chlorine will vary with different types of ore, amount of ore, temperature, etc., and are best determined experimentally. However, flow rates should be high enough to remove volatile gold species from the hot zone.

Optimum time of reaction will also depend on the above-discussed variables, but a reaction time of about 5 minutes to 1 hour usually results in efficient recovery of the gold.

It has been found that the volatile complex $AuMeCl_6$ is formed by way of an intermediate compound of the formula $Me_2Cl_{6(g)}$, where Me is iron, aluminum or gallium. In the presence of this compound, and chlorine, gold reacts to form the volatile $AuMeCl_6$. Hence, the promoter employed in the process of the invention comprises a compound of iron, aluminum or gallium which, in the presence of chlorine, will react to form the anhydrous chloride $Me_2Cl_{6(g)}$. Particularly effective promoters, as illustrated in the examples below, have been found to consist of metallic, i.e., elemental, iron, a sulfide of iron, such as pyrite ($FeS_2$), ferrous sulfide (FeS), pyrrhotite ($Fe_5S_6$), chalcopyrite ($CuFeS_2$) or bornite $$(FeS \cdot 2Cu_2S \cdot CuS),$$

aluminum sulfide or gallium sulfide. In addition, good results are obtained by the use of mixtures of elemental sulfur and ferric oxide, and elemental sulfur and ferric chloride hexahydrate.

The promoter is preferably added to the ore in a ground state, i.e., a mesh size of about 10 to 325, and admixed with the ore before and during the reaction. However, it may also be added in bulk form, e.g., as lumps, without intimate admixture with the ore. The optimum amount of promoter will again depend on such variables as the specific type and physical state of the ore and promoter, temperature, etc., and is best determined experimentally. However, amounts of about 0.5 to 5 weight percent of promoter, based on the weight of the ore, are usually satisfactory. Where the naturally-occurring ore originally contains one or more of the promoter materials, a correspondingly smaller amount of promoter is required. Some ores may, in fact, contain sufficient amounts of promoter to permit direct treatment of the ore with gaseous chlorine at elevated temperature, without addition of further promoter material.

Since the $AuMeCl_6$ complex exists as a vapor only at elevated temperature, i.e., usually above about 200° C., it is readily condensed, after leaving the reaction zone, to yield a brown colored solid. An air-cooled condenser is usually sufficient to condense the complex; however, an aqueous alkaline solution may be used to absorb any minor amount of complex remaining in the gas stream. A sodium hydroxide solution of about 10 percent concentration is usually satisfactory for this purpose. However, the volatile complex can usually be quantitatively recovered by simply cooling to a temperature below about 100° C., this being one of the important advantages of the process of the invention.

The condensed complex is readily dissolved in water, or in an acidic or basic aqueous solution, and the gold may be recovered from the resulting solution by conventional means, e.g., precipitation on metallic iron or on activated carbon in acid solution, or by means of electrolysis from a concentrated solution, or by reduction using suitable reducing reagents.

The following examples will serve to more particularly illustrate the invention.

Examples 1–12

In these examples a series of experiments were conducted at various temperatures using, in each experiment, a 20-gram charge of a synthetic ore and 0.25 gram of promoter. The synthetic ore consisted of silica flour mixed with precipitated gold, the mixture containing 0.4 ounce gold per ton of synthetic ore. Various promoters, as listed in Table 1, were mixed with the charge and the mixture was placed in a 1-inch diameter ceramic tube that was rotated inside the hot zone of a 1½ inch diameter tube furnace. The combustion tube was sealed with rubber stoppers and the temperature of the furnace rapidly raised to the operating temperature with chlorine gas passing through the system at a flow rate of 50 cc. per minute. The reaction was continued for a period of 60 minutes and the amount of gold volatilized was determined by analysis of the residue in the reaction zone. Results are shown in Table 1. It will be noted that metallic iron and the iron sulfides, pyrite, and ferrous sulfide, gave high yields of gold at temperatures as low as 250° C.

TABLE 1

| Promoter | Temperature of— | | | |
|---|---|---|---|---|
| | 200° C. | 250° C. | 300° C. | 400° C |
| None | 0 | 4 | 19 | 65 |
| $FeS_2$ (pyrite) | 92 | 99 | 97 | 99 |
| FeS | 62 | 93 | 93 | 99 |
| $Fe_5S_6$ (pyrrhotite) | 66 | 80 | 89 | 93 |
| $CuFeS_2$ (chalcopyrite) | 3 | 41 | 60 | 99 |
| $Na_2S$ | 11 | 7 | 0 | 0 |
| Fe | 83 | 94 | | |
| $Fe_2O_3$ | 16 | | 2 | 88 |
| $Fe_2O_3 + S$ | 0 | | 90 | 98 |
| S | 17 | 12 | 31 | 79 |
| $FeCl_3 \cdot 6H_2O$ | 0 | | 24 | 89 |
| $FeCl_3 \cdot 6H_2O + S$ | 86 | | 99 | 99 |

Examples 13–16

In these examples experiments similar to those of Examples 1–12 were conducted, except that the promoter consisted of either aluminum sulfide ($Al_2S_3$) or gallium sulfide ($Ga_2S_3$). Results are shown in Table 2. It will be seen that both of these promoters gave excellent yields of gold at all the temperatures employed.

TABLE 2

| Temperature, ° C. | Promoter | | |
|---|---|---|---|
| | None | $Al_2S_3$ | $Ga_2S_3$ |
| 200 | 0 | 96 | 99+ |
| 250 | 4 | 98 | 98 |
| 300 | 19 | 99+ | 97 |
| 400 | 65 | 99+ | 97 |

We claim:

1. A process for recovering gold from gold ore consisting essentially of contacting the ore at a temperature of about 200 to 500° C. with aqueous chlorine in the presence of a promoter from the group consisting of metallic iron, a sulfide of iron, aluminum sulfide, gallium sulfide, a mixture of elemental sulfur and ferric oxide, and a mixture of elemental sulfur and ferric chloride hexahydrate capable of reacting with the gaseous chlorine to form the compound $Me_2Cl_{6(g)}$, where Me is iron, aluminum or gallium, thereby forming a volatile complex consisting essentially of $AuMeCl_6$, where Me is iron, aluminum or gallium, removing said complex from the reaction zone in vapor form and condensing said vapor to recover the gold as the $AuMeCl_6$ complex.

2. The process of claim 1 in which the promoter is metallic iron.

3. The process of claim 1 in which the promoter is a sulfide of iron.

4. The process of claim 3 in which the promoter is pyrite.

5. The process of claim 3 in which the promoter is ferrous sulfide.

6. The process of claim 1 in which the promoter is aluminum sulfide.

7. The process of claim 1 in which the promoter is gallium sulfide.

8. The process of claim 1 in which the promoter consists of a mixture of elemental sulfur and ferric oxide.

9. The process of claim 1 in which the promoter consists of a mixture of elemental sulfur and ferric chloride hexahydrate.

References Cited

UNITED STATES PATENTS

| 3,021,209 | 2/1962 | Murray et al. | 75—83 |
| 3,049,422 | 8/1962 | Wolcott | 75—83 X |
| 741,712 | 10/1903 | Pohle et al. | 423—44 |
| 702,943 | 6/1902 | Guiraud | 423—44 |
| 1,262,452 | 4/1918 | Clawson | 423—44 |

MILTON WEISSMAN, Primary Examiner

U.S. Cl. X.R.

75—83

UNITED STATES PATENT OFFICE
CERTIFICATE OF CORRECTION

Patent No. 3,825,651          Dated July 23, 1974

Inventor(s) Dennis D. Fischer, Harold J. Heinen and Judith A. Eisele

It is certified that error appears in the above-identified patent and that said Letters Patent are hereby corrected as shown below:

Column 4, line 4, "aqueous" should read -- gaseous --.

Signed and sealed this 19th day of November 1974.

(SEAL)
Attest:

McCOY M. GIBSON JR.           C. MARSHALL DANN
Attesting Officer                Commissioner of Patents